United States Patent [19]

Dahl

[11] 3,996,579
[45] Dec. 7, 1976

[54] BATTERY ELECTROLYTE LEVEL INDICATOR

[76] Inventor: Ernest A. Dahl, 3247 Breaker Drive, Ventura, Calif. 93003

[22] Filed: Nov. 26, 1975

[21] Appl. No.: 635,557

[52] U.S. Cl. ............................... 340/249; 429/92; 340/244 C
[51] Int. Cl.² ...................................... G08B 21/00
[58] Field of Search ......... 340/249, 244 C; 320/48; 324/29.5; 136/182

[56] References Cited
UNITED STATES PATENTS 1,695,917   12/1928   Conrad .............................. 340/249

Primary Examiner—John W. Caldwell
Assistant Examiner—Daniel Myer
Attorney, Agent, or Firm—Richard S. Sciascia; Joseph M. St.Amand; Darrell E. Hollis

[57] ABSTRACT

A battery electrolyte level indicator for indicating when the electrolyte of a wet cell battery has fallen below a minimum acceptable level. A probe pair is disposed in each cell of the battery to a depth corresponding to the minimum acceptable level of the electrolyte contained therein. The probe pairs are connected in series with a light emitting diode connected between the probe pairs in the end battery cells. The series connected probe pairs and the light emitting diode form a complete circuit loop. Current limiting resistors bridge each probe pair such that when the electrolyte level in any one cell is below the minimum acceptable level, the current limiting resistor replaces the probe pair in the complete circuit loop, thus turning off the light emitting diode.

13 Claims, 6 Drawing Figures

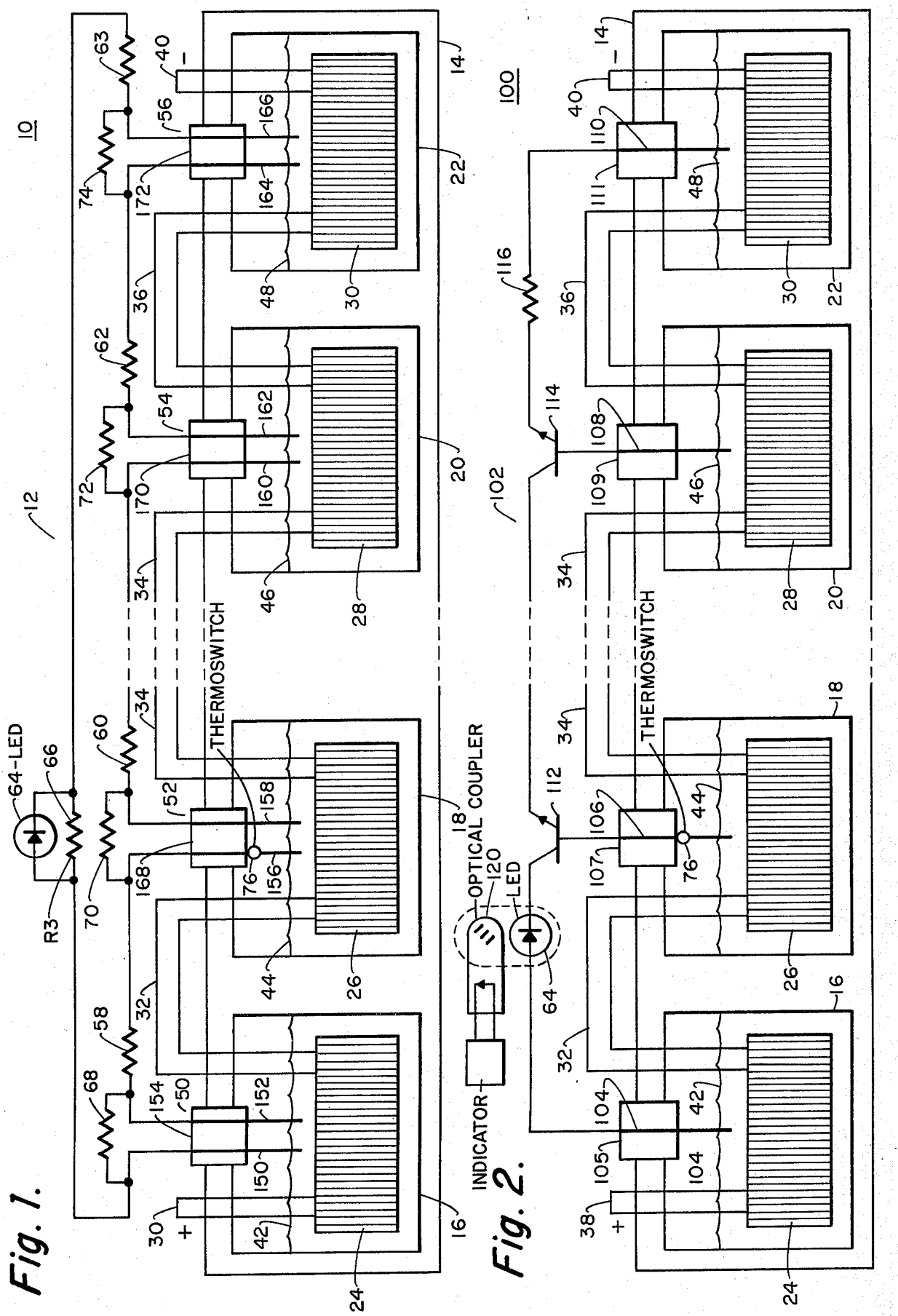

BATTERY ELECTROLYTE LEVEL INDICATOR

STATEMENT OF GOVERNMENT INTEREST

The invention described herein may be manufactured and used by or for the Government of the United States of America for governmental purposes without the payment of any royalties therein or therefor.

BACKGROUND OF THE INVENTION

1. Field of the Invention

This invention relates generally to battery electrolyte level indicators for indicating when the electrolyte level in a wet cell battery has fallen below a minimum acceptable level, and more particularly to such electrolyte level indicators that are electrically isolated from the battery ground.

2. Description of the Prior Art

The placing of wet cell batteries on automobiles due to the design thereof makes the battery inaccessible and sometimes inconvenient to periodically check. For reason, vehicle owners become negligent and allow the electrolyte level in the battery in their vehicle to be lowered to a depth allowing the plates disposed in the battery to be exposed. This causes a quicker deterioration of the battery than is normal and, hence, the need exists for a device to warn a vehicle operator of a battery condition. This device must be able to monitor the level of the electrolyte in a battery that is inaccessibly placed and inform the vehicle operator in the driving compartment of a low electrolyte level.

SUMMARY OF THE INVENTION

A battery electrolyte level indicator for indicating when the electrolyte of any cell of a wet cell battery has fallen below a minimum acceptable level. A probe pair is disposed in each individual cell of the battery to a depth corresponding to the minimum acceptable level of the electrolyte contained therein. The probe pairs are connected in series with a light emitting diode connected between the probe pairs located in the end battery cells. The series connected probe pairs and the light emitting diode form a complete circuit loop. Current limiting resistors bridge each probe pair such that when the electrolyte level in any one cell is below the minimum acceptable level, the current limiting resistor replaces the probe pair in the complete circuit loop. The current limiting resistor reduces the current in the complete circuit loop below that required for the diode to emit light. Thus, the light emitting diode turns off. The indicator is electrically isolated from the battery ground.

Accordingly, one object of the present invention is to provide an improved electrolyte level indicator that utilizes a conductive fluid as a portion of an indicating circuit with the indicating circuit being electrically isolated from the battery ground.

Another object of the present invention is to provide an improved electrolyte level indicator for a storage battery which gives a visual indication of a low electrolyte level.

A further object of the present invention is to provide an improved electrolyte level indicator for a storage battery that utilizes transistors.

A still further object of the present invention is to provide an improved temperature and voltage level indicator.

Another object of the present invention is to reduce cost and increase reliability.

Other objects and a more complete appreciation of the present invention and its many attendent advantages will develop as the same becomes better understood by reference to the following detailed description when considered in connection with the accompanying drawings in which like reference numerals designate like parts throughout the figures thereof and wherein.

BRIEF DESCRIPTION OF THE DRAWINGS

FIG. 1 is a view partly in perspective and partly schematic of a specific embodiment of the present invention.

FIG. 2 is a view partly in perspective and partly schematic of another specific embodiment of the present invention.

DETAILED DESCRIPTION OF THE PREFERRED EMBODIMENT

Figure 3A:
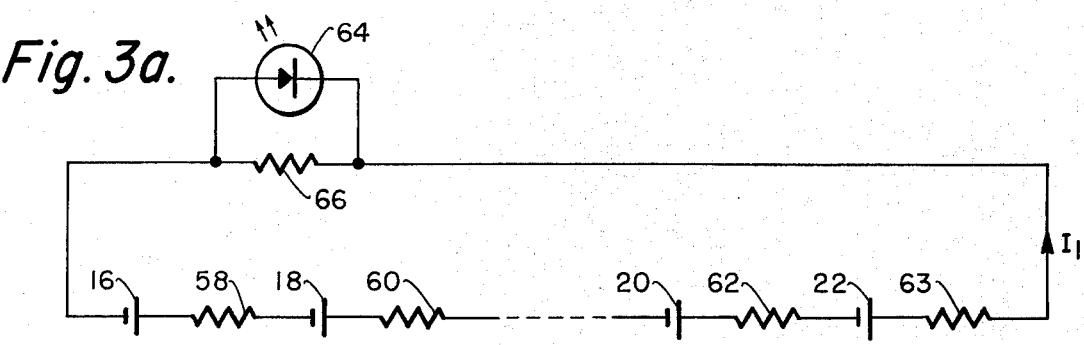
FIGS. 3a and 3b are schematic diagrams illustrating the operation of the circuit in FIG. 1.

Now turning to FIG. 1, a first embodiment of the present invention generally labeled 10 is illustrated. Embodiment 10 comprises a battery electrolyte level indicator 12 and wet cell battery 14. Wet cell battery 14 contains a plurality of individual cells designated 16, 18, 20 and 22 in FIG. 1. As denoted by the three dashed lines, the battery 14 may contain a large number of individual cells similar to individual cells 16, 18, 20 and 22, shown in FIG. 1. The individual cells 16, 18, 20 and 22 contain the usual series of parallel-spaced battery plates 24, 26, 28 and 30, respectively. The individual cells 16, 18, 20 and 22 are connected in series with interconnections 32, 34 and 36. Interconnection 32 connects cells 16, 18. Interconnection 34 connects cells 18 and 20. Interconnection 36 connects cells 20 and 22. In addition, cell 16 contains positive terminal 38 while cell 22 contains negative terminal 40. Call 16 and cell 22 are end cells while cells 18 and 20 are middle cells. The level of electrolyte in cells 16, 18, 20 and 22 is designated 42, 44, 46 and 48, respectively.

Disposed in individual cell 16 is probe pair 50. Probe pair 50 consists of a pair of metallic probes 150 and 152 held in place in cell 16 by a cap 154. The metallic probes 150 and 152 of probe pair 50 extend downward into cell 16 to a level below the electrolyte level 42. Probes 150 and 152 are of substantially identical length. It is noted that the level to which the probes 150 and 152 of probe pair 50 extend is a level corresponding to a minimum acceptable level of electrolyte in cell 16. This minimum acceptable level of electrolyte may vary from battery to battery depending upon the operating environment thereof. Caps 154, 168, 170 and 172 are designed to provide a variable depth capability for probe pairs 50, 52, 54 and 56. Similar probe pairs 52, 54 and 56 with probes 156, 158, 160, 162, 164 and 166, and caps 168, 170 and 172 are located in cells 18, 20 and 22, respectively. Probe pairs 50, 52, 54 and 56 are connected in series with a resistor between each. For example, resistor 58 is connected between probes 152 and 156. Resistor 60 is connected between probes 158 and 160. Resistor 62 is connected between probes 162 and 164.

It is noted that probe pairs 50 and 56 are located in the end cells of battery 14. Light emitting diode 64 is connected between probe pairs 50 and 56. A resistor 66 is connected in parallel with light emitting diode 64.

One side of light emitting diode 64 is connected to probe 150 while the other side is connected to resistor 63.

Resistor 68 bridges probe pair 50, i.e., it is connected between probes 150 and 152. Resistor 70 bridges probe pair 52, i.e., it is connected between probes 156 and 158. Resistor 72 bridges probe pair 54, i.e., it is connected between probes 160 and 162. Resistor 74 bridges probe pair 56, i.e., it is connected between probes 164 and 166. It is noted that resistors 68, 70, 72 and 74 are current limiting resistors, as they are on the order of ten times larger than resistors 58, 60, 62 and 63.

Thermoswitch 76 is connected to probe 156 of probe pair 52. Thermoswitch 76 is located above electrolyte level 44. It is noted that each cell of battery 14 may contain a thermoswitch 76. However, only one thermoswitch 76 is shown in FIG. 1 for convenience.

Figure 3B:
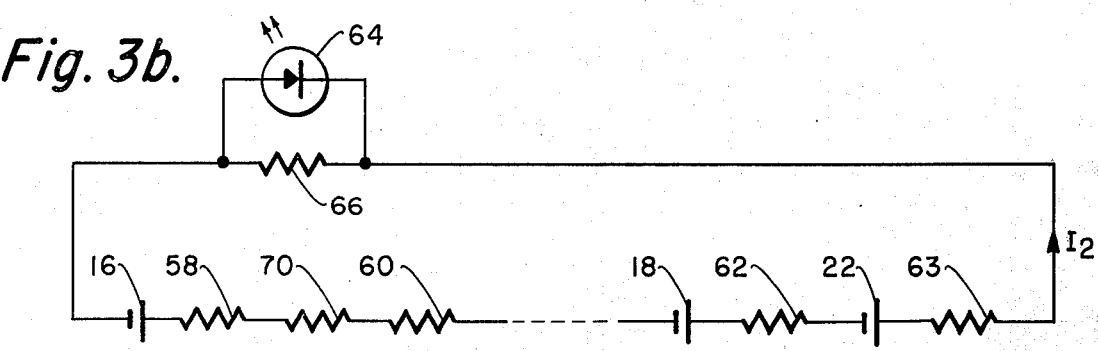

Now turning to FIGS. 3a and 3b, the operation of the embodiment disclosed in FIG. 1 is described. FIG. 3a is a schematic diagram of the embodiment 10 when the electrolyte levels 42, 44, 46 and 48 are above the minimum acceptable electrolyte level in cells 16, 18, 20 and 22, respectively. As is noted from the schematic diagram, each cell 16, 18, 20 and 22 form an individual battery in FIG. 3a. The batteries 16, 18, 20 and 22 provide enough electromotive force to generate a current $I_1$ which is sufficient to cause light emitting diode 64 to emit light. Hence, light emitting diode 64 will illuminate or generate light whenever electrolyte levels 42, 44, 46 and 48 are above the minimum acceptable level.

FIG. 3b illustrates the embodiment 10 of FIG. 1 with the electrolyte level 44 below the minimum acceptable level or below the end of probe pair 52 in cell 18. When electrolyte level 44 is below the ends of probe pair 52, probe pair 52 is taken out of the circuit and resistor 70 is substituted therefor. Since resistor 70 is on the order of ten times larger than resistors 58, 60, 62 or 63, a new current $I_2$ is established in the circuit. $I_2$ is less than $I_1$ and insufficient to cause light emitting diode 64 to generate light. It is noted that the size of resistor 70 is to be determined from the number of cells contained in battery 14 as well as the current characteristics of the light emitting diode 64. As an example, for a typical six volt battery, resistors 68, 70, 72 and 74 may be one thousand ohms each while resistors 58, 60 62 and 63 are one hundred ohms each.

It is noted that when battery 14 overheats, thermoswitch 76 is actuated, thereby taking probe pair 52 out of the circuit and inserting resistor 70 therein.

Now turning to FIG. 2, embodiment 100 is illustrated. Embodiment 100 includes electrolyte level indicator 102, shown disposed in battery 14. Cells 16 and 22 of battery 14 are end cells while cells 18 and 20 and all cells in between cells 18 and 20 are middle cells. Each cell 16, 18, 20 and 22 contains a single probe 104, 106, 108 and 110, held in place by caps 105, 107, 109, and 111, respectively. Each probe 104, 106, 108 and 110 extends through battery 14 and to a depth below the electrolyte level shown in FIG. 2. The tips of probes 104, 106, 108 and 110 are each placed at the minimum acceptable electrolyte level in respective cells 16, 18, 20 and 22.

The base of transistor 112 is connected to probe 106 while the base of transistor 114 is connected to probe 108. The emitter of transistor 112 is connected to the collector of transistor 114. A light emitting diode 64 is connected between probe 104 and the collector of transistor 112. Resistor 116 is connected between the emitter of transistor 114 and probe 110. It is noted that a transistor is disposed in each middle cell such that if there are $n$ middle cells, then there are $n$ transistors. All $n$ transistors are connected in series. Only two series connected transistors are shown in FIG. 2 for convenience.

Optical isolator or optical coupler 120 which serves to provide a visual indication at a remote location is shown associated with light emitting diode 64. It is noted that light emitting diode 64 in both FIGS. 1 and 2 may be replaces with other appropriate signals such as bells, lights, buzzers, or control for high rate charging devices, etc. Also, an optical coupler 120 may be associated with light emitting diode 64 in FIG. 1.

Figure 4A:
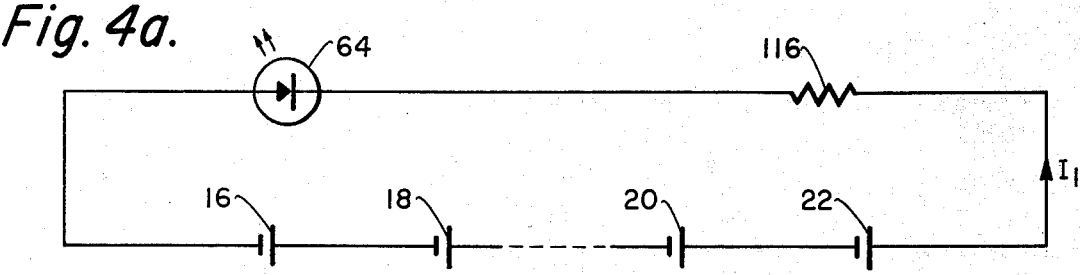
FIGS. 4a and 4b are schematic diagrams illustrating the operation of the embodiment disclosed in FIG. 2.
Figure 4B:
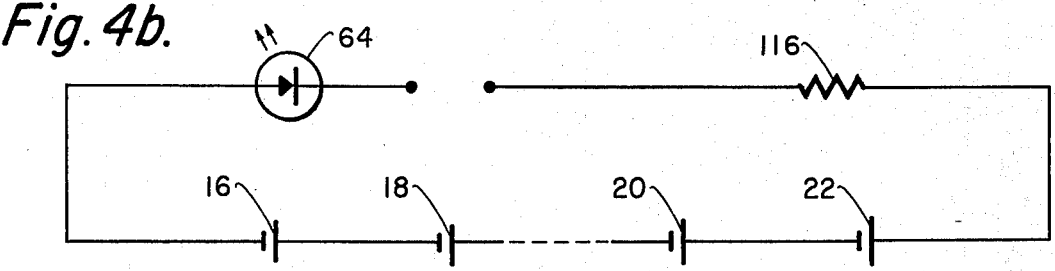

Now turning to FIGS. 4a and 4b, embodiment 100 of FIG. 2 is schematically illustrated to show the operation thereoof. The circuit of FIG. 4a represents the circuit of embodiment 100 when the electrolyte levels 42, 44, 46 and 48 are above the tips of probes 104, 106, 108 and 110. In that case, both transistors 112 and 114 are conducting or shorted, thereby providing a current $I_1$ to light emitting diode 64. Current $I_1$ is sufficient to cause light emitting diode 64 to emit light.

FIG. 4b is a schematic of the circuit of embodiment 100 whenever the electrolyte level 42, 44, 46 and/or 48 is below the minimum acceptable level or below the tip of probes 104, 106, 108 and/or 110. In that case, transistors 112 and/or 114 will stop conducting or open, thereby prohibiting a current from flowing through light emitting diode 64. Of course, should electrolyte levels 42 and 48 in end cells 16 and 22 drop below the minimum acceptable level, or should battery 14 overheat, thereby actuating thermoswitch 76, then again the completed circuit shown in FIG. 4b would be open and no current would flow through light emitting diode 64. In addition, if the voltage in any middle cell drops below a minimum acceptable voltage level, current will be prohibited from flowing through light emitting diode 64. For example, if the voltage in cells 18 or 20 drops below a minimum acceptable level, the voltage on the bases of transistors 112 or 114, respectively, will be insufficient to maintain transistors 112 or 114, respectively, in the "on" or conducting state. Thus, the current flowing through light emitting diode 64 will be terminated. Also, if the voltage in any end cell drops below a minimum acceptable level, the current flowing through light emitting diode 64 will be insufficient to generate light therefrom.

Theremoswitch 76 is connected to probe 106. Thermoswitch 76 is located above electrolyte level 44. It is noted that each cell of battery 14 may contain a thermoswitch 76. However, only one thermoswitch 76 is shown in FIG. 2 for convenience.

It is noted that the probes 50, 52, 54, 56, 104, 106, 108 and 110 are fabricated from a suitable metallic substance, preferably carbon, to avoid chemical reaction with the electrolyte contained in each cell. It is noted that in both embodiments 10 and 100, battery electrolyte level indicators 12 and 102 are both electrically isolated from the battery ground or from the ground of any external vehicle or other object to which the battery may be connected. In short, the embodiments 10 and 100 form closed circuit loops, as shown in FIGS. 3a and 4a.

Obviously numerous modifications and variations of the present invention are possible in light of the above teachings. It is therefore to be understood that within the scope of the appended claims the invention may be practiced otherwise than as specifically described herein.

I claim:

1. A fluid level indicator for a storage battery having a plurality of series-connected cells including a first and a second end cell as well as a series of first through nth middle cells comprising:
   a. a plurality of probes, one said probe being disposed in each cell of said battery to a depth corresponding to the minimum acceptable level of the electrolyte contained in the cell;
   b. a series of first through nth electrical switches, one each being connected to the probe in each said middle cell, said switches being connected in series;
   c. signal means connected between said first electrical switch and said probe disposed in said first end cell for providing a signal whenever said electrolyte level falls below said minimum acceptable level in any said cell and whenever the voltage level in any said cell drops below a minimum acceptable level; and
   d. current limiting means connected between said nth electrical switch and said probe disposed in said second end cell, said signal means and said electrical switches and said current limiting means and said battery cells forming a complete circuit loop.

2. The apparatus of claim 1 wherein said series of first through nth electrical switches includes a series of first through nth transistors.

3. The apparatus of claim 1 wherein said current limiting means includes a resistor.

4. The apparatus of claim 1 wherein said signal means includes a visual indicator.

5. The apparatus of claim 4 wherein said visual indicator includes a light emitting diode.

6. The apparatus of claim 4 further including an optical coupler associated with said visual indicator for providing a visual indication at a remote location and for controlling a remote high rate charging device.

7. The apparatus of claim 1 further including a thermoswitch disposed in at least one said cell and connected to one said electrical switch for actuating said signal means when said battery overheats.

8. A fluid level indicator for a storage battery having a plurality of series connected cells including a first and second end cell comprising:
   a. a plurality of probe pairs, one said probe pair being disposed in each cell of said battery to a depth corresponding to the minimum acceptable level of the electrolyte contained in the cell, said probe pairs being connected in series;
   b. signal means connected between said probe pair located in said first end cell and said probe pair located in said second end cell, said probe pairs and said signal means and said battery cells frorming a complete circuit loop; and
   c. current-limiting means bridging each said probe pair such that when said electrolyte level drops below the minimum level in any one cell, said current-limiting means replaces said respective probe pair in said complete circuit loop.

9. The apparatus of claim 8 wherein said current-limiting means includes a resistor.

10. The apparatus of claim 8 wherein said signal means includes a visual indicator.

11. The apparatus of claim 10 wherein said visual indicator includes a light emitting diode.

12. The apparatus of claim 10 further including an optical coupler associated with said visual indicator for providing a visual indication at a remote location.

13. The apparatus of claim 8 further including a thermoswitch disposed in at least one said cell and connected to at least one said probe pair for placing a respective current-limiting means in said complete circuit loop when said battery overheats.

* * * * *